United States Patent [19]

Myers

[11] 4,084,304
[45] Apr. 18, 1978

[54] METHOD OF CONSTRUCTING A VALVE

[75] Inventor: Bruce B. Myers, South Bend, Ind.

[73] Assignee: The Bendix Corporation, South Bend, Ind.

[21] Appl. No.: 784,763

[22] Filed: Apr. 5, 1977

[51] Int. Cl.$^2$ .............................................. B23P 15/00
[52] U.S. Cl. ................................ 29/157.1 R; 29/445; 137/539; 251/359
[58] Field of Search ......................... 29/157.1 R, 445; 137/539, 539.5; 251/359, 365

[56] References Cited

U.S. PATENT DOCUMENTS

| | | | |
|---|---|---|---|
| 2,069,153 | 1/1937 | Konkle | 29/157.1 R |
| 2,106,567 | 1/1938 | Hufferd | 29/445 |
| 2,448,483 | 8/1948 | Bassett | 251/359 |
| 3,557,821 | 1/1971 | Siegel et al. | 137/539 |
| 3,626,978 | 12/1971 | Hoekstra | 29/157.1 R |
| 3,736,640 | 6/1973 | Freiheit | 29/157.1 R |
| 3,844,531 | 10/1974 | Grengs | 29/157.1 R |

Primary Examiner—E. M. Combs
Assistant Examiner—Daniel C. Crane
Attorney, Agent, or Firm—Paul David Schoenle; Ken C. Decker

[57] ABSTRACT

The present invention relates to a method of constructing a valve. The valve comprises a casing with a bore therein for receiving a valve member. The bore also receives a plug which is engageable with the valve member to control communication through an opening on the plug. The method comprises the steps of inserting the valve member in the bore, connecting the plug with the casing such that the valve member is engageable with the plug and welding the plug to the casing while at the same time embedding the valve member into the plug to provide a valve seat on the plug. In particular, the casing and plug are a thermoplastic material, such as Nylon, and the valve member is metallic so that ultrasonic welding softens the plastic to bind the casing to the plug and to deform the plug by engaging the valve member with the softened plug.

3 Claims, 3 Drawing Figures 4,084,304

METHOD OF CONSTRUCTING A VALVE

BACKGROUND OF THE INVENTION

A charging and relief valve such as illustrated in U.S. Pat. Application Ser. No. 757,263 provides for charging an accumulator and relieving the same as the pressure differential across the valve varies. As the relief valve is disposed within a casing of the charging valve portion, it is advantageous to construct the charging and relief valve as a single unitary assembly.

Moreover, during the construction of the charging and relief valve it is important to provide a valve seat which cooperates with the relief valve portion to prevent leakage through the relief valve below a predetermined pressure.

SUMMARY OF THE INVENTION

The present invention provides a method for constructing a charging and relief valve. The method provides a thermoplastic casing and a thermoplastic plug which is received within a bore on the casing. A valve member comprising a metallic ball and resilient member is inserted in the casing bore such that the ball engages the plug. With the valve member and plug inserted in the casing bore in a unitary assembly such that the valve member is biased into engagement with the plug, the unitary assembly is subjected to ultrasonic welding to permanently connect the plug and casing while simultaneously embedding the ball into the plug to form a valve seat. Consequently, the valve seat formed on the plug substantially matches with the ball of the valve member.

Moreover, the plug is provided with a passage having a frusto conical leading surface which is engaged with the ball and deformed during welding to form the matching valve seat. The frusto conical surface is provided because the ball is resiliently biased into engagement therewith rather than fixedly positioned thereagainst as is the case between the casing and plug. Consequently, the vibration imparted during ultrasonic welding is only partially felt at the engagement between the ball and frusto conical leading surface. Nevertheless, a single welding application sufficiently joins the casing and plug while also forming the matching valve seat between the ball and plug.

DETAILED DESCRIPTION

Figure 1:
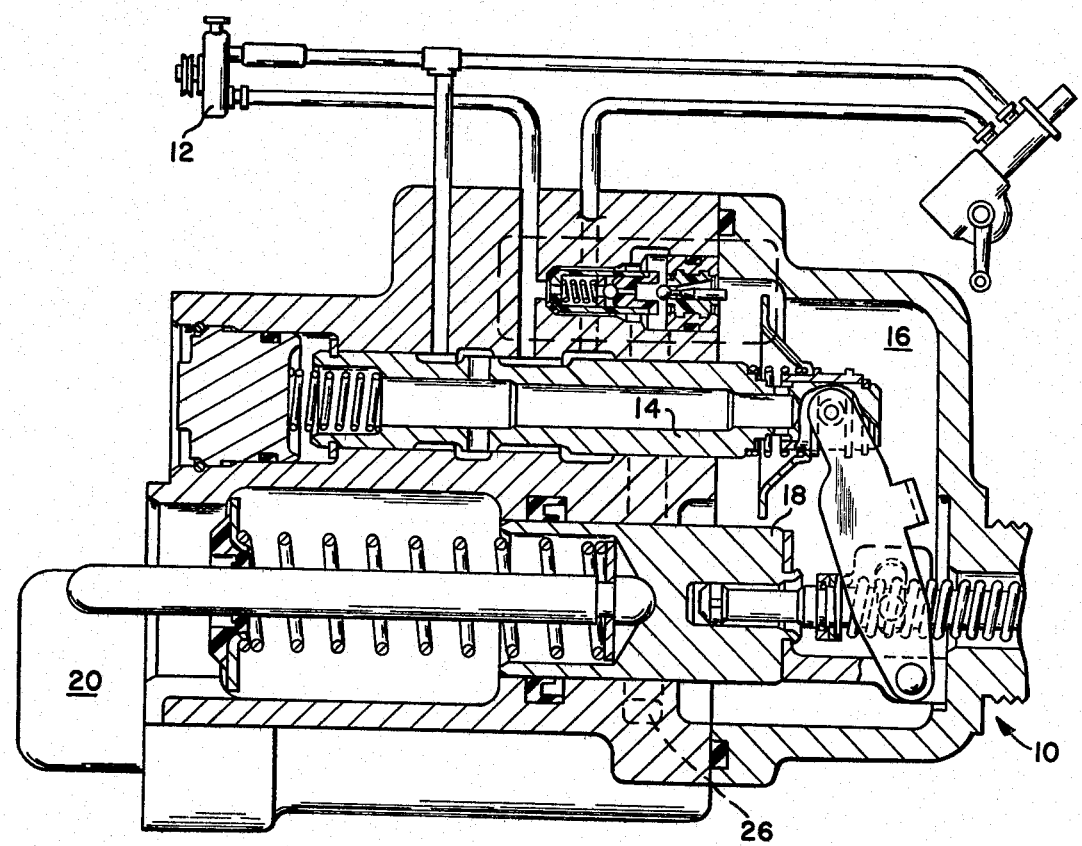
FIG. 1 is a schematic view of a braking system having a hydraulic brake booster with a charging and relief valve illustrated in cross section.

A hydraulic brake booster 10 communicates with a fluid pressure source 12 such as a power steering pump and cooperates with a master cylinder (not shown) to provide a power assist during braking. A spool valve 14 communicates pressurized fluid to a pressure chamber 16 to urge a piston 18 to the left viewing FIG. 1 in order to activate the master brake cylinder. If the pressure source is rendered inoperable, an accumulator 20 is provided to communicate stored pressurized fluid to the pressure chamber 16 so that a power assist is transmitted to the master brake cylinder.

In order to charge the accumulator 20, a charging and relief valve 30 is disposed within the bore 24. The bore 24 extends from an inlet passage 22 to an accumulator passage 26 and is provided with a transverse face 28. The passage 26 communicates with the accumulator 20 and a check valve 32 is engageable with an operator actuator 34 to open the passage 26 and accumulator 20 to the pressure chamber 16.

When the pressure within the passage 26 is less than the pressure in the inlet passage 22, the charging and relief valve 30 is movable to the right to communicate pressurized fluid via the clearance between the valve 30 and the bore 24 to the passage 26 and accumulator 20. Conversely, a tapered edge 36 on the valve 30 sealingly engages the elastomeric ring 38 to prevent leakage from the high pressure fluid in passage 26 to the low pressure inlet passage 22. If the pressure within the passage 26 exceeds a predetermined value a relief valve 40 is pressure responsive to open communication between the high pressure fluid in passage 26 and the inlet passage 22 via openings 42 and 44. The spring force constant of spring 46 determines the predetermined value permitted in the passage 26 and accumulator 20.

In accordance with the invention, the charging and relief valve 30 comprises a thermoplastic casing 50 having a bore 52 and a tapered edge 36 for engaging the elastomeric ring 38. In addition, a thermoplastic plug 60 telescopes into the bore 52 and forms the passage 42. The relief valve 40 is disposed within the bore 52 and is provided with a metallic ball 62, a metal washer 64 and a spring 66 resting on a shoulder 68 at the end of bore 52. Preferably, the thermoplastic casing and plug are made of a Nylon plastic.

Figure 3:
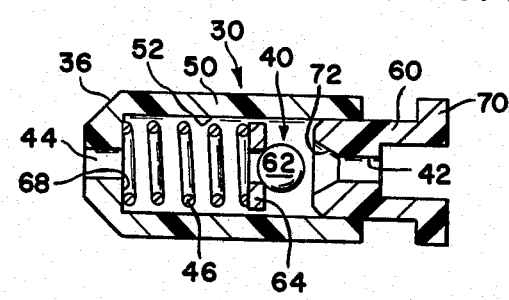
FIG. 3 is an exploded view of the valve illustrated in FIG. 2.

In the exploded view of FIG. 3, it is seen that the Nylon plastic casing 50 is provided with the outwardly tapered edge 36 at the end forming the opening 44 while the bore 52 receives the Nylon plastic plug 60. The plug 60 includes a radially extending flange 70 opposing the casing 50 and abutting the same when the plug is fully inserted in the bore 52. The plug opening 42 leads to an inwardly tapered frusto conical surface 72 which opposes and abuts the ball 62 when the plug is fully inserted in the bore 52, at which time the spring 46 engages the shoulder 68 to urge the ball 62 against the frusto conical surface.

Figure 2:
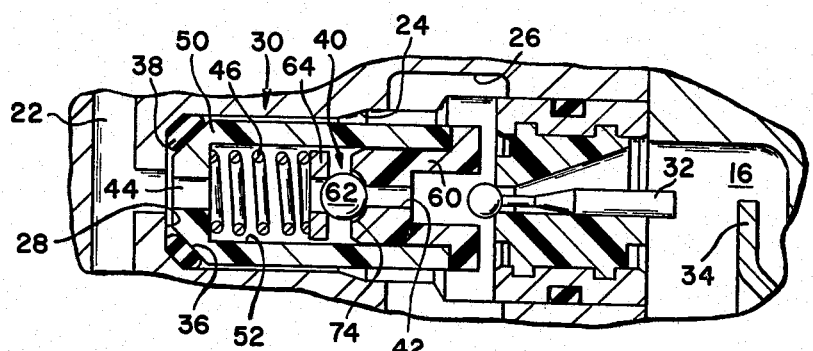
FIG. 2 is an enlarged view of the encircled portion of FIG. 1.

In carrying out the invention, the plug 60 is fully inserted into the casing bore 52 such that the radial flange 70 abuts the casing 50 and the spring 46 abuts the shoulder 68 to bias the ball 62 against the frusto conical surface 72. Then, the casing and plug are subjected to energy such as ultrasonic welding at a pressure of about 25 p.s.i. and a frequency of 20 Hz for about 0.1 second. Comparing FIG. 3 with FIG. 2, wherein the unitary charging and relief valve 30 is shown after welding, it is seen that the Nylon plastic casing and plug are bonded together and the ball 62 is embedded into the frusto conical surface 72 to form a matching spherical valve seat 74.

It is an important feature of the present method invention that the matching valve seat 74 is formed simultaneously with the joining of the plug and casing. Consequently, a single welding application joins the casing with the plug and forms the matching valve seat 74 between the ball 62 and plug 60.

As the ball 62 is metallic rather than plastic, the ball will embed itself into the plug frusto conical surface 72 to form the spherical seat 74 rather than join with the plug 60. Moreover, the spring 46 biases the ball 62 against the frusto conical surface 74 throughout the single welding application to provide for the deformation of the surface 74. Therefore, the shape of the valve seat 74 is transformed from the frusto conical surface 72 of FIG. 3 to the spherical shape of surface 74 in FIG. 3 which matches with the spherical shape of ball 62.

Although the present invention has been described in conjunction with the charging and relief valve 30, it is apparent that many variations are evident to those skilled in the art. Consequently, these variations are intended to fall within the scope of the present invention as measured by the appended claims.

I claim:

1. A method of constructing a valve having a valve member retained within a casing by means of a plug cooperating with the casing, said method comprising:
   providing a surface on the plug such that the valve member engages the surface;
   biasing the valve member into engagement with the plug by a resilient member; and
   energizing the plug and casing to join the plug and casing;
   said energizing also cooperating with the biased valve member and the plug surface to form a valve seat on the plug surface.

2. A method of constructing a valve comprising:
   providing a casing, a plug and a valve member;
   inserting the valve member within the casing;
   engaging the plug with the casing such that the valve member is biased by a resilient member into engagement with the plug; and
   softening the casing and plug such that the casing and plug are fastened to each other and the valve member forms a valve seat on the plug at the engagement therebetween, said softening providing for deformation of the plug by the biased valve member to form a valve seat on the plug that matches with the shape of the valve member.

3. The method of claim 2 in which ultrasonic welding vibrates the valve member and plug to deform the plug such that a valve seat is formed on the plug by the valve member.

* * * * *